United States Patent [19]

Allread et al.

[11] Patent Number: 5,182,922
[45] Date of Patent: Feb. 2, 1993

[54] AUTOMOTIVE AIR-CONDITIONING SYSTEM

[75] Inventors: Alan R. Allread; Dennis B. Chichester, both of Jackson; Russell L. Rogers, Munith, all of Mich.; Steven M. Knowles, Woodburn, Ind.

[73] Assignee: Aeroquip Corporation, Maumee, Ohio

[21] Appl. No.: 856,598

[22] Filed: Mar. 24, 1992

Related U.S. Application Data

[62] Division of Ser. No. 795,444, Nov. 21, 1991.

[51] Int. Cl.$^5$ ............................................... B60H 1/32
[52] U.S. Cl. ........................................ 62/239; 285/267
[58] Field of Search ............... 62/239, 244, 323.1, 62/295; 285/166, 263, 264, 267, 275

[56] References Cited

U.S. PATENT DOCUMENTS

| | | | |
|---|---|---|---|
| 900,533 | 10/1908 | Hawley | 285/267 |
| 1,543,348 | 6/1925 | Venton | 285/267 |
| 1,604,868 | 10/1926 | Woodruff | 285/267 |
| 2,010,546 | 8/1935 | Kenney | 62/296 |
| 2,021,689 | 11/1935 | Jordan | 62/296 X |
| 2,121,115 | 6/1938 | Bergdoll | 62/239 X |
| 2,273,395 | 2/1942 | Couty | 285/90 |
| 2,550,536 | 4/1951 | Delano, Jr. et al. | 285/94 |
| 2,657,076 | 10/1953 | Hubbell | 285/91 |
| 2,760,347 | 8/1956 | Dolza | 62/298 X |
| 2,836,436 | 5/1958 | Bianchi | 285/113 |
| 3,528,260 | 9/1970 | Binder | 62/498 |
| 3,788,394 | 1/1974 | Derragon, Jr. | 165/134 |
| 4,034,571 | 7/1977 | Bollinger | 62/244 |
| 4,408,467 | 10/1983 | Murnane et al. | 62/296 |
| 4,480,857 | 11/1984 | Graves | 285/45 |
| 4,793,150 | 12/1988 | Wattley et al. | 62/296 |
| 4,906,027 | 3/1990 | De Gruitjer | 285/51 |
| 5,048,873 | 9/1991 | Allread et al. | 285/261 |

Primary Examiner—William E. Tapolcai
Attorney, Agent, or Firm—Emch, Schaffer, Schaub & Porcello Co.

[57] ABSTRACT

Method and apparatus are disclosed for an improved automotive air-conditioning system wherein the refrigerant transport system connecting the compressor to the evaporator and condenser comprises rigid tubing therby minimizing the loss of refrigerant otherwise experienced by use of flexible hose connections.

16 Claims, 4 Drawing Sheets

AUTOMOTIVE AIR-CONDITIONING SYSTEM

"This is a divisional of copending application(s) Ser. No. 07/795,444 filed on Nov. 21, 1991"

TECHNICAL FIELD

The present invention relates to an automotive air-conditioning system including a fluid transport system for conveying the flow of refrigerant through rigid lengths of conduit or tubing fastened together by flexible connectors capable of accommodating the vibrations, and movement to which the system is subjected during operation of an automotive vehicle with minimal effusion or leakage of fluid from or ingression of moisture into the system and without creating excessive levels of fluid dynamic noise. Preferred flexible connectors for use in the system are also disclosed.

BACKGROUND OF THE INVENTION

The following patents have been considered in the preparation of this application: U.S. Pat. Nos. 2,010,546; 2,273,395; 2,657,076; 2,836,436; 3,528,260; 3,788,394; 4,408,467; 4,480,857; and 4,793,150 and 5,048,873.

In a typical automobile air-conditioning system presently in use, refrigerant is conveyed through a fluid transport system connecting the compressor to the condenser and the evaporator, consisting of flexible hoses combined with rigid tubing to accommodate the vibration and movement existing between the vehicle frame, upon which the condenser and evaporator are rigidly affixed, and the vehicle engine upon which the compressor is rigidly affixed.

Refrigerant utilized in automobile air-conditioning systems has historically been R12 freon, which is a chloroflourocarbon (CFC). More recently, R134a, which is a hydroflourocarbon (HFC), has been adopted and is expected to replace R12 as the dominant refrigerant used in such systems. R134a Refrigerant is extremely expensive, much more expensive than R12. However, with progressive taxation recently placed on R12 refrigerants, its cost will similarly rise. Accordingly, it is important that air-conditioning systems used in automotive vehicles be designed to prevent, to the greatest degree possible, any escape of R134a or R12 refrigerant into the atmosphere. The challenge to develop such a system has intensified because flexible hose assemblies presently used to convey refrigerant through the system permit refrigerant loss by effusion through the hose wall and end fitting connection sites.

Additionally, flexible hoses presently used in automotive air-conditioning systems permit variable levels of moisture ingression, which, over time, greatly reduces the efficiency of the system. Flexible hoses are also subject to twisting during installation, which not only causes premature wear, but also places undesirable stresses and potential sources of leakage at the fittings fastening such hoses to system elements. In contrast, rigid lengths of tubing formed of any one of a wide variety of materials are capable of transporting such refrigerants throughout the air-conditioning system without effusion of refrigerant or infusion of undesirable moisture through the conduit walls. For example, the tubing may be formed of metal such as aluminum, steel or a variety of other metals; however, aluminum is preferred from the standpoint of minimizing weight. Additionally, the tubing may be formed of a wide variety of plastics including but not limited to nylon. In order to utilize rigid lengths of tubing for conveying the refrigerant in an air-conditioning system of an automotive vehicle, while providing a system which meets industry standards with respect to minimizing effusion of refrigerant from and infusion of moisture into the system, it is necessary that the rigid lengths of tubing include flexible connectors that permit pivotal, articulating, and/or rotational movement of one tube section length relative to another.

As is well known in the art, refrigerant in the air-conditioning system of a motor vehicle is transported under varying pressures including pressures potentially as high as 500 psi. Accordingly, it is necessary that any connectors for connecting lengths of tubing have adequate means, for sealing therebetween, to prevent or at least minimize the leakage of refrigerant. As may be appreciated, the challenge is to provide an air-conditioning system including a refrigerant transport system having flexible connectors for fastening together the rigid tubing lengths such that there is no appreciable effusion of refrigerant from or infusion of moisture into the system and, perhaps of a more recent consequence, a refrigerant conveyance and containment system that minimizes or eliminates refrigerant leakage to the atmosphere.

SUMMARY OF THE INVENTION

Accordingly, it is an object of the present invention to provide an air-conditioning system, for an automotive vehicle in which the means for transporting the refrigerant between system elements is comprised solely of rigid lengths of tubing fastened together by flexible connectors, capable of withstanding the rigors of automotive air-conditioning use with minimal effusion or leakage of refrigerant and minimal ingression of moisture into the system.

It is a further object of the present invention to provide a flexible connector that is capable of fastening together two lengths of rigid tubing without significant leakage of fluid or ingression of moisture.

It is an additional object of the present invention to provide a flexible connector that is capable of joining together two lengths of rigid tubing and which is capable of accommodating the vibrations and movement encountered in automotive use.

It is another object of the present invention to provide a flexible connection system for automotive fluid conveyance applications utilizing rigid tubing, such system minimizing undesirable noise generation.

These and other objects of the present invention will become more clear from the following description taken in conjunction with the annexed sheets of drawings.

PRIOR ART

The design and operation of automotive air-conditioning systems is well known in the industry. For a detailed operating description of such systems, the reader is directed to "AIR-CONDITIONING SERVICE MANUAL, 2nd Edition", Copyright 1985 by Intertec Publishing Corporation, P. O. Box 12901, Overland Park, Kans. 66212, or any other pertinent text on such systems.

Figure 1:
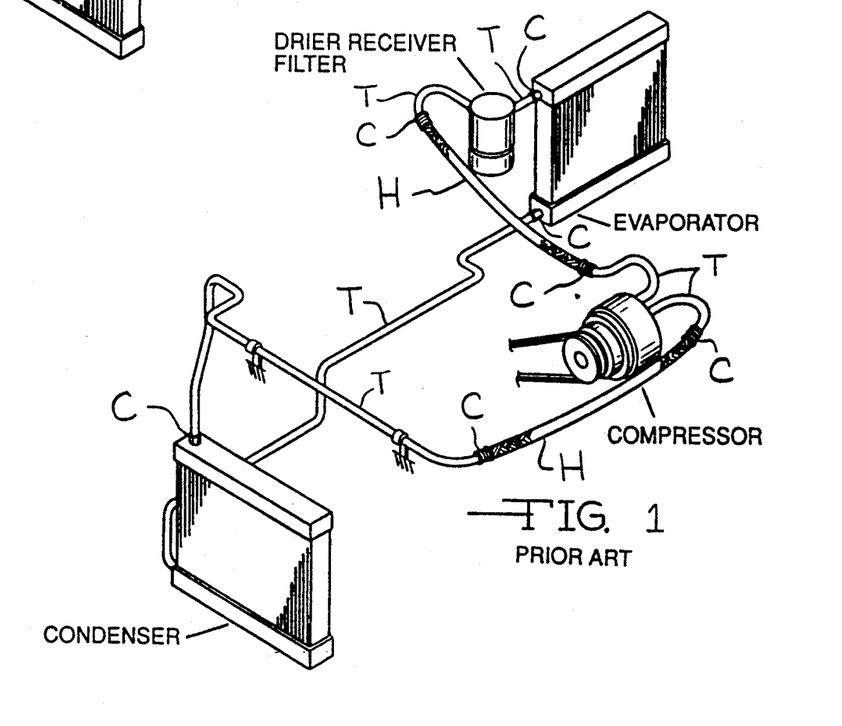
FIG. 1 is a view showing schematically a prior art automotive air-conditioning system installed as original equipment on a 1987 Chevrolet Caprice automobile utilizing flexible hoses combined with rigid lengths of tubing for conveying refrigerant throughout the system.

FIG. 1 shows an automotive air-conditioning system installed as original equipment on a 1987 Chevrolet Caprice automobile. The system, as shown, is typical of present-day automotive systems in that rigid tubing T is utilized for refrigerant connections between the condenser and evaporator, which are rigidly attached to the vehicle frame, thereby having little or no relative movement between them. However, because the compressor is rigidly affixed to its prime mover, the automobile engine, and because there exists a significant amount of relative movement and vibration between the engine and the vehicle frame, the refrigerant connections between the compressor and the evaporator and between the compressor and the condenser typically comprise combinations of rigid tubing T and flexible hose H. The flexible hose H being required to accommodate the engine vibrations and movement relative to the vehicle frame upon which the evaporator and condenser are affixed.

Other elements, such as an expansion valve, mufflers, and a sight glass, are typically installed in the system; however, for the sake of simplicity, these elements are shown.

DESCRIPTION OF THE PRESENT INVENTION

Figure 2:
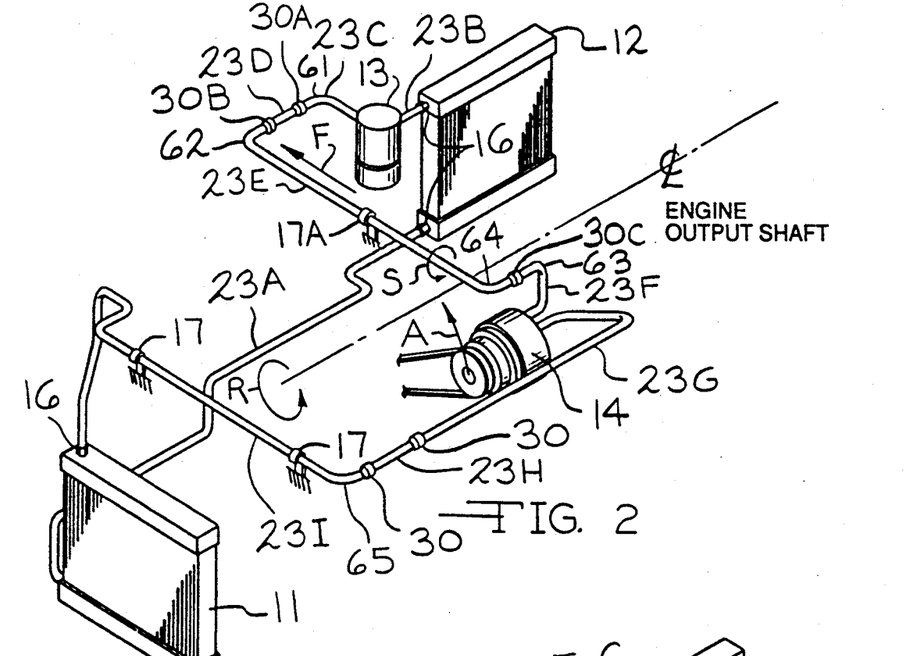
FIG. 2 is a schematic view showing a prototype rigid tubing system, in accordance with the present invention, as installed on a 1987 Chevrolet Caprice.

As shown in FIG. 2, the air-conditioning system of the present invention basically includes a condenser 11, evaporator 12, drier-receiver 13, compressor 14, and a fluid transport system for carrying refrigerant therethrough in a closed loop. The refrigerant transport system comprises rigid lengths of tubing connected to each other by flexible connectors 30 preferably of the type described in FIGS. 3–6. Conventional threaded connectors 16 are used to connect the rigid lengths of tubing to the condenser 11, evaporator 12, drier-receiver 13 and compressor 14.

The rigid lengths of tubing include section 23A carrying refrigerant in liquid form from the condenser 11 to the evaporator 12. The portion of tubing section 23A adjacent the evaporator 12 is typically enlarged to receive therein an expansion valve (not shown). Refrigerant arrives at the expansion valve in liquid form and at a pressure typically between 180 and 230 psi. It is reduced in pressure upon having the expansion valve to 15 to 30 psi and is converted into vapor. Refrigerant in vapor form passes from the evaporator 12 through section 23B, drier-receiver 13 and sections 23C, 23D, 23E and 23F to compressor 14. The vapor exits the compressor 14 through tubing sections 23G, 23H and 23I connected to the condenser 11. The compressor 14 builds the vapor to a pressure typically within the range of 180 to 230 psi at which pressure it enters the condenser 11 for conversion back to a liquid. Brackets 17 support the lengths of tubing 23F and 23I.

The prototype automotive air-conditioning system embodying the present invention as shown in FIG. 2 was installed on a 1987 Chevrolet Caprice automobile. As can be seen by comparing FIGS. 1 and 2, the combination of tubing and flexible hose connections between the compressor and the evaporator and between the compressor and the condenser have been replaced by rigid lengths of tubing in combination with flexible connectors that are further described below.

Although the refrigerant connections comprising rigid lengths of tubing in our prototype system might have been routed more advantageously it was our intent to duplicate the original equipment system for comparison purposes.

Referring to FIG. 2, the automobile engine (not shown) is mounted to the vehicle frame by means of resilient engine mounting fixtures such that when a high torque is applied to the engine output shaft, the engine will rotate counter-clockwise (viewed from the front of the vehicle) about the engine output shaft center line as indicated by rotational arrow R. As a consequence thereof, the compressor 14 (rigidly attached to the engine) and the tubing lengths 23F and 23G, as a fixed unit, will move upward and to the left (viewed from the front of the vehicle) as indicated by arc A. Thus, tubing length 23E will tend to rotate counter-clockwise about clamp 17A, thereby placing a counter-clockwise torsional force upon rigid tube 23F at connector 30C and upon rigid tube 23D at connector 30B. Similarly, a counter-clockwise torsional force will be applied to rigid tube 23H.

In addition to the applied torsional forces described above, a downward bending moment will be applied to rigid tube 23F at connector 30C and a similar downward bending moment will be applied to rigid tube 23D, at connector 30A, by action of the counter-clockwise rotation of rigid tube 23E about clamp 17A. Similarly, an upward bending moment will be applied to rigid tube 23H.

If the torsional forces and bending moments, as described above, are not accommodated, undue stress and strain will be placed upon the rigid lengths of tubing and/or the threaded connectors 16 at the evaporator, condenser and/or compressor, resulting in stress cracking and refrigerant loss.

To accommodate the above-described torsional forces and/or bending moments, the rigid tubing lines connecting the compressor to the evaporator and connecting the compressor to the condenser, in accordance with the present invention, are provided with selectively positioned flexible connectors capable of accommodating the torsional forces and the bending moments experienced in each respective rigid tube line. As will be seen below, the improved flexible connector taught herein below is constructed to accommodate the requisite torsional forces and bending moments experienced in the typical automotive air-conditioning system.

The exact location and number of flexible connectors required in each compressor refrigerant line must necessarily be empirically determined and will depend upon the fluid transport system configuration as dictated by each vehicle installation. However, it can reasonably be assumed that at least one flexible connector will be required in each compressor refrigerant line to accommodate the torsional forces and bending moments that will otherwise be imposed upon each respective rigid tubing line.

Figure 7:
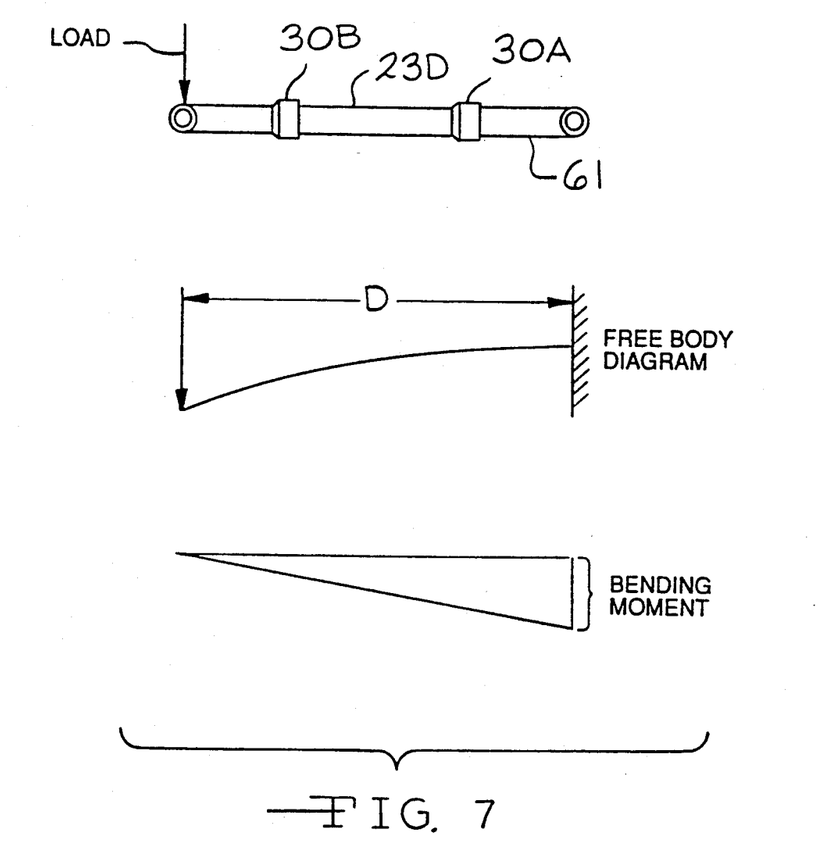
FIG. 7 shows a free body diagram and the resulting bending moment diagram of a section of rigid tubing wherein flexible connectors have been placed to accumulate the inherent moment of the air-conditioner compressor.

Referring again to the prototype installation, as shown in FIG. 2, it will be noted that two flexible connectors 30A and 30B have been placed in that portion of the refrigerant line, one at either end of rigid tub 23D. As described above, conunter-clockwise moment of compressor 14 along arc A causes elbow 62 to move downward, thereby loading the composite link, comprising elbow 62 rigid tube 23D and elbow 61, in the manner of a simple beam fixed at one end (elbow 61) and having a point load placed at its free end (elbow 62). FIG. 7 presents a representative free body and moment diagram for the composite link. The maximum bending moment is seen to occur at elbow 61. Therefore, it is preferred to place one flexible connector at elbow 61 to relieve the maximum bending moment. Depending upon the degree of flexure available in flexible connector 30A, it may be necessary to provide a second connector 30B to adequately accommodate the maximum anticipated downward movement of elbow 62.

Although one flexible connector at elbow 61 is theoretically sufficient, we have discovered that two flexible connectors are preferred to assure that little or no bending moments are transferred to elbow 61. Consider that, as elbow 62 moves downward, it will thereby tend to rotate upward because of a torsional force S imparted to rigid tube 23E by the movement of compressor 14 upward along arc A. If only one flexible connector 30A were provided, an upward force would be imparted to elbow 61, thereby imparting a negative bending moment to elbow 61. Thus, the placement of a second flexible connector 30B will eliminate or minimize, depending upon the internal friction of the flexible connectors, the application of such a negative bending moment upon elbow 61. Similarly, two flexible connectors were placed adjacent to elbow 65.

Although one flexible connector 30C was found to be sufficient at the compressor end of rigid tube 23E, other installations may require two flexible connectors for reasons stated above.

PREFERRED FLEXIBLE CONNECTORS

Figure 3:
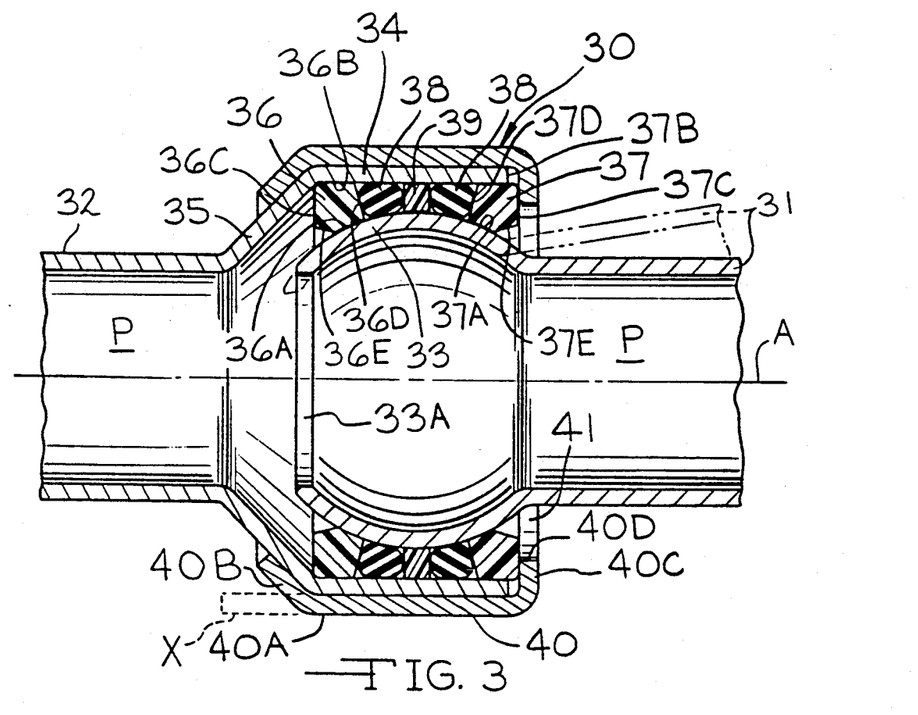
FIG. 3 is a sectional view showing a flexible connector for fastening together adjacent lengths of rigid tubing and embodying the present invention.
Figure 4:
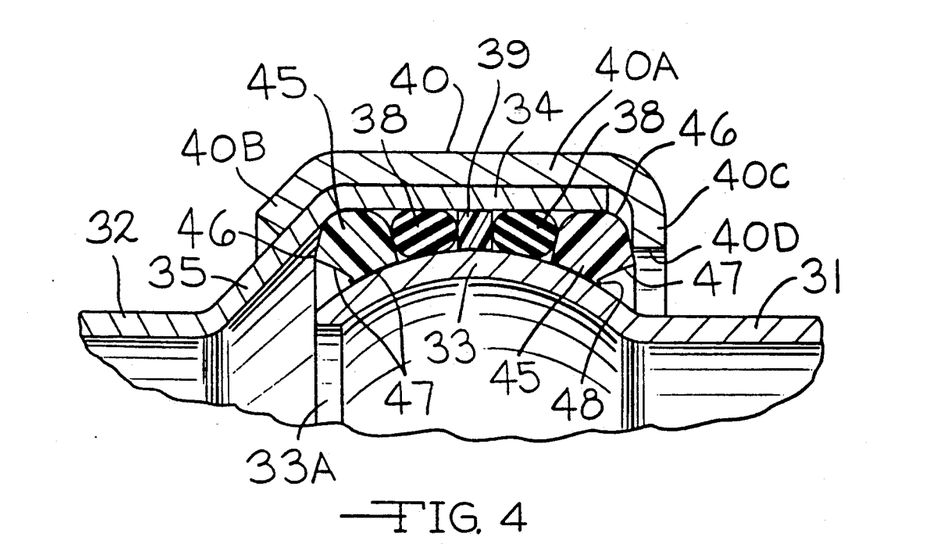
FIG. 4 is an enlarged fragmentary view, similar to FIG. 3, showing a flexible connector embodying the present invention and having a modified circumferential bearing design.

Referring now to FIGS. 3 and 4, there is shown a flexible connector 30 for fastening together lengths of tubing 31 and 32 as used in the present invention. As shown, the lengths of tubing 31 and 32 extend along a common axis A and each length of tubing 31 and 32 defines a passageway P for the conveyance of fluid therethrough. As will be appreciated, in the case of the automotive air-conditioning system, the fluid to be conveyed is a refrigerant such as freon. Although the connector of the present invention is taught herein for use with air-conditioning refrigerant, it will be readily apparent that many types of fluids, gaseous or liquid, could flow satisfactorily through the flexible connector system of the present invention.

As can be seen in FIG. 3, the first length of tubing 31 has been enlarged, through processes well-known in the art, to form a spherical enlargement 33 terminating in an open end 33A. The second length of tubing 32 is enlarged to a significantly greater extent forming an end section 34 having a cylindrical configuration about axis A and an intermediate conical section 35 joining the main portion of the second length 32 of tubing and the cylindrical end section 34. As shown, the intermediate section 35 has a configuration of cone frustum; however, other configurations may be used for such intermediate section 35.

As can be seen in FIG. 3, the spherical enlargement 33 of the first length of tubing 31 is received within the cylindrical end section 34 of the second length of tubing 32. The outer diameter of the spherical enlargement 33 taken through a plane perpendicular to axis A is smaller than the inner diameter of the cylindrical end section 34 with the result that the spherical enlargement 33 is in spaced relationship with the inner surface of the cylindrical end section 34.

Positioned within such space are a pair of circumferential nylon bearings 36 and 37 which function as bearings supporting the spherical enlargement 33 in the cylindrical end section 34. The bearing 36 adjacent the open end 33A of the spherical enlargement 33 includes a first surface 36A contoured with a spherical shape conforming to and engaging the outer spherical surface of the spherical enlargement 33 and a generally opposing surface 36B having a generally cylindrical configuration conforming to the interior surface of the cylindrical end section 34. The bearing 36 is also shown as having a forward surface 36C, a trailing surface 36D and an interior surface 36E extending between the spherical surface 36A and the forward surface 36C.

Similarly, the bearing 37 has a first surface 37A contoured with a spherical-shape conforming to and engaging the outer spherical surface of the spherical enlargement 33, a cylindrical surface 37B contoured to conform to and engage the interior surface of the cylindrical end section 34, a trailing surface 37C, a forward surface 37D and an interior surface 37E joining the spherical surface 37A with the trailing surface 37C. The bearings 36 and 37 are preferably formed of nylon but may be formed of other materials possessing chemical resistance to the fluid being conveyed and sufficient strength to support the members in sealed position while permitting rotational and pivotal movement between the first length of tubing 31 and the second length of tubing 32. Other suitable materials include various metals, ceramics and other thermoplastics.

Positioned between the bearings 36 and 37 are a pair of O-ring seals 38 which are spaced apart with a circumferential spacer 39 positioned therebetween. Other seals having different configurations may be used in lieu of O-rings. The O-ring or other seals 38 are preferably formed of resilient, chemically stable polymeric materials, such as nitrile, chlorobutyl, hydrogenated nitrile or Neoprene W. The O-ring seals 38 are compressed between and form a liquid and vapor tight seal between the outer spherical surface of the spherical enlargement 33 and the interior surface of the cylindrical end section 34. The O-ring seals 38 may also contact the adjacent bearing 36 or 37 and the spacer 39; however, such contact is not required for a liquid and vapor tight seal. The spacer may be formed of the same material as the bearings.

A collar 40 is provided to secure together the spherical enlargement 33 of the first length of tubing 31, within the intermediate section 35 and cylindrical end section 34 of the second length of tubing 32, with the bearings 36 and 37, O-ring seals 38 and spacer 39 therebetween. The collar 40 has a central cylindrical section 40A sized to snugly engage the outer surface of the enlarged cylindrical end section 34 of second length of tubing 32, a tapered end section 40B tapering inwardly to a position to engage the intermediate section 35 of such second length of tubing 32 and a radially inwardly directed flange 40C that snugly engages the trailing surface 37C of bearing 37. The end of the collar 40, forming the tapered end section 40B, initially is cylindrical and extends beyond the forward surface 36C of bearing 36 as shown in dashed lines labelled X in FIG. 3. After the respective components are joined to the position shown in FIG. 3 but with the cylindrical section 40A of the collar 40 extending longitudinally beyond the forward surface 36C of the bearing 36 to the position X illustrated in dashed lines, such end portion is crimped to form the tapered end section 40B. As can be seen in FIG. 3, such crimping of the collar 40 to form the tapered end section 40B, firmly engages the bearings 36 and 37 within the space between the spherical enlargement 33 and the interior surface of the cylindrical end section 34, with the forward surface 36C of bearing 36 being held in place by the juncture of the intermediate section 35 of the second length of tubing 32 with the cylindrical end section 34. As may be appreciated from viewing FIG. 3, the portion of the spherical enlargement 33 aligned with the spacer 39 may be considered as the apex which is closer to the inner surface of the cylindrical end section 34 than other portions of such spherical enlargement 33 and the bearings 36 and 37 are positioned on opposite sides of such apex, thus securing the spherical enlargement 33 in place while permitting pivotal and rotational movement between the first length of tubing 31 and the second length of tubing 32.

As will be appreciated, it would be possible to deform the opposite end of the collar 40, thereby forming the flange 40C in place.

As can be readily seen in FIG. 3, the flange 40C of the collar 40 terminates at an end 40D which is radially spaced from the first length of tubing 31, thus leaving a gap 41 between such end 40D and the side wall of the first length of tubing 31. The presence of the gap 41 coupled with the spherical configuration of the outer surface of the spherical enlargement 33 slidably engaged to the spherical surfaces 36A and 37A of the bearings 36 and 37, respectively, permits the first length of tubing 31 to move pivotally about the cylindrical end section 34 of the second length of tubing 32 to the position, for example, as shown in phantom lines in FIG. 3. Additionally, as will be appreciated, such construction also permits the first length of tubing 31 to be moved rotationally relative to the second length of tubing 32.

If desired, the outer surface of the spherical enlargement 33 may be provided with Teflon ® or other useful coatings that will serve to reduce the frictional wear on the bearings 36 and 37 and seals 38 thereby increasing their useful life. Additionally, while it is preferred that both of the bearings 36 and 37 be solid throughout the annulus, if the first length of tubing 31 has an enlargement at the end opposite the spherical enlargement 33 or anywhere in between which prevents a solid type bearing to be slipped thereover, the bearing 37 may be formed with a split in order to permit it to be assembled around the first length of tubing 31 and assebled to the spherical enlargement 33.

As will be appreciated, the cross-sectional shape of the bearing 36 and 37 are non-symmetric. This requires care in assembly to make certain such bearings 36 and 37 are properly positioned.

In FIG. 4, there is shown a modified embodiment in which there is provided a modified flexible connector utilizing universal bearings 45, one at each end, in lieu of the bearings 36 and 37, respectively, of the embodiment of FIG. 3. Except for the change in configuration of the bearings 45, the flexible connector of the embodiment of FIG. 4 is identical to that shown and described with respect to FIG. 3.

Figure 6:
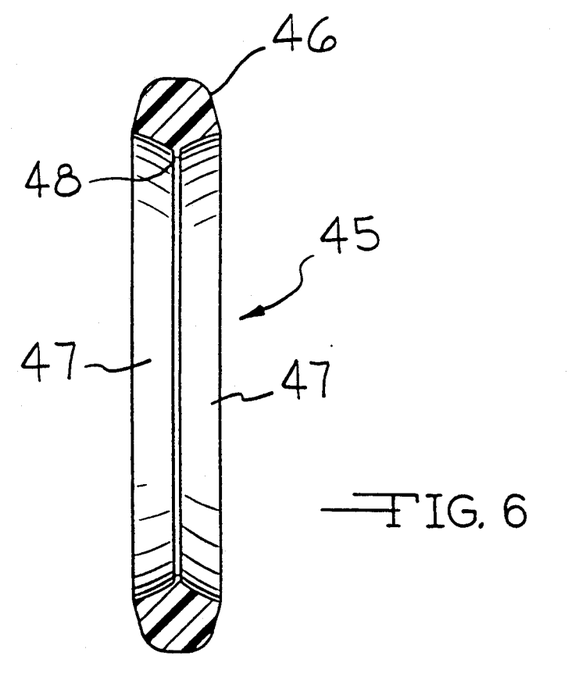
FIG. 6 is an enlarged sectional view of the modified circumferential bearing as shown in FIGS. 4 and 5.

An enlarged cross-sectional view of the modified bearing 45 is shown in FIG. 6. The modified bearing 45 includes an exterior surface 46 following a generally U-shaped configuration with the legs of the U tapering outwardly and with an area near the top of the U intended to engage the interior surface of the enlarged cylindrical end section 34 of the second length of tubing 32.

In the case of the bearing 45 adjacent the open end 33A of the spherical enlargement 33, a portion of exterior surface 46 removed from the top of the U will engaged the interior surface of the intermediate section 35. In the case of the other bearing 45, the crimped end 40C of collar 40 will engage the exterior surface 46 in the leg area of the U.

The bearing 45 also has a pair identical interior surfaces 47 which follow a spherical configuration similar to that of the outer surface of the spherical enlargement 33. As an optional feature, there may be provided a radially inwardly extending lip 48 extending from the respective interior surfaces 47 and lying on a plane extending centrally through the bearing 45.

As can be seen in FIG. 4, upon joining the various elements of the connector together, the lip 48 of each of the modified bearings 45 will, under pressure, be bent or folded over and act as a dust wiper as it moves against the exterior surface of the spherical enlargement 33 upon movement of the first length of tubing 31 relative to the second length of tubing 32.

Figure 5:
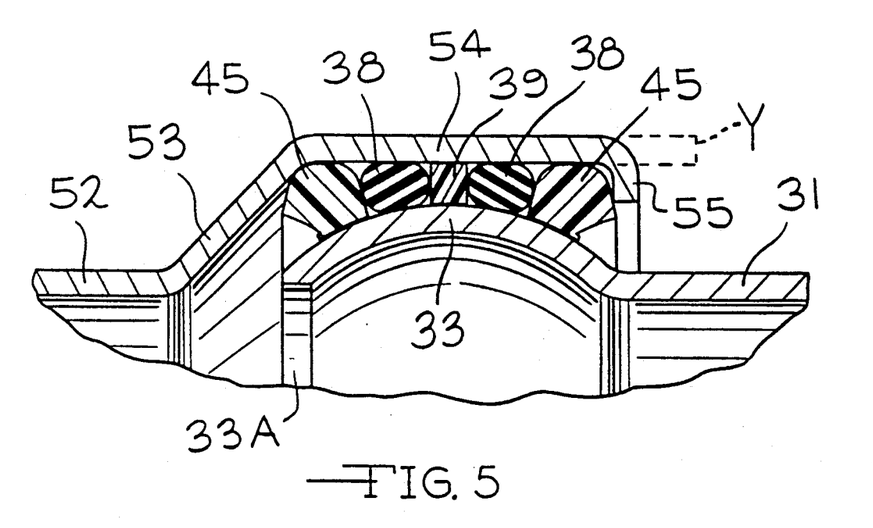
FIG. 5 is a view similar to FIG. 4 showing an alternate embodiment of a flexible connector incorporating the present invention.

Referring now to FIG. 5, there is shown a further modification of the flexible connector of the present invention which is particularly well-suited for joining together lengths of tubing which are subjected to lower internal pressure, for example, something on the order of less than 230 psi. Thus, while the embodiments shown in FIGS. 3 and 4 utilizing the collar 40 for securing the various members together will desirably be used for systems which operate under pressures in excess of 230 psi and as high as 500 psi, or even higher, the embodiment of FIG. 5 is less expensive in that it does not utilize a collar and is satisfactory for lower pressure applications. Understandably, these pressures will vary depending upon the hardness and the strength of materials being used.

Under the embodiment of FIG. 5, the first length of tubing 31 is identical to that utilized in the embodiments of FIGS. 3 and 4 and has a spherical enlargement 33 at the end to be joined to the second length of tubing. In the embodiment of FIG. 5, there is provided a second length of tubing 52 having an enlarged cylindrical end section 54 joined to the main tubing portion 52 by an outwardly tapering intermediate section 53. As in the previous embodiments, specifically the embodiment of FIG. 4, there is provided a pair of identical circumferential bearing members 45, a pair of O-ring seals 38 and a spacer 39, each of which is engaged to the exterior surface of the spherical enlargement 33 and the interior surface of the enlarged cylindrical end section 54. Under this embodiment, following assembly of the members together and with the end of the enlarged cylindrical end section 54 extending beyond the right-hand bearing 45 as shown in dashed lines in FIG. 5 at Y, such end shown in dashed lines is then deformed around the end of such right-hand bearing 45 to form a radially inwardly directed flange 55 to hold the assembly together.

Additionally, for some applications, including ones having low internal pressure, it is possible to have only a single O-ring seal in which case it will not be necessary to have a spacer 39. Such modified connector would have two bearings 36, 37 or 45, 45 with one O-ring seal 38 positioned therebetween in sealing engagement with the outer surface of the spherical enlargement 33 in the area of the apex and the interior surface of the enlarged cylindrical end section 34 or 54. Similarly, any of the aforementioned connector design can or may utilize an array of numbers and shapes of seals or seal-and-bearing combinations to accommodate both necessary sealing and articulation parameters.

The flexible connector of the present invention is one which permits rigid lengths of tubing to be joined together in a manner providing an effective seal therebetween while, at the same time, permitting necessary movement commensurate with that required for an automotive air-conditioning system.

Tests have been conducted which show that the system described and shown herein using exclusively connectors of the type shown in FIG. 3 for connecting together the ends of adjacent rigid lengths of tubing significantly exceeds the performance standards established by the Society of Automotive Engineers (SAE) for permeation of refrigerant 12 from components of automotive air-conditioning systems.

Extensive road tests and permeation tests were conducted on the prototype system as shown in FIG. 2, 1987 Chevrolet Caprice whose air-conditioning system had been modified by removing all flexible hoses and replacing them with lengths of rigid lengths of aluminum tubing. All of the lengths of tubing which adjoined other lengths of tubing were connected together with the embodiments shown in FIG. 3. In such modified system, for the purposed of the tests, five flexible connectors of the type shown in FIG. 3 were used. Conventional threaded male/female couplings were used to connect the appropriate lengths of tubing to the compressor, evaporator, condenser, and the drier receiver filter. Using such modified refrigerant delivery system, the tests showed that actual loss of refrigerant R12 at normal summer operating temperatures of 80° to 90° F. external temperature was less than 0.025 ounces/ft$^2$/year which is significantly less than the above referenced SAE Standard which allows losses of 3 to 20 lb./ft$^2$/year. Thus, the system of the present invention provides outstanding permeation resistance.

The flexible connector and transport system of the present invention also has excellent resistance to ingression of moisture. An industry specification establishes as standard a maximum moisture ingression level not to exceed 0.25 gram/in$^2$/year. Tests conducted on the system described above resulted in moisture ingression levels significantly less than 0.1 gram/in$^2$/year, well within the levels set forth in the such specification.

Although the system for transporting fluids utilizing rigid lengths of tubing and the flexible connectors disclosed herein is ideally suited for automotive and other vehicle air-conditioning systems, it should be understood that such transport system may also be used for transporting fuel and a wide variety of other liquids and gases.

Many modifications will become readily apparent to those skilled in the art. Accordingly, the scope of the present invention should be based only upon the scope of the appended claims.

We claim:

1. In an automotive vehicle refrigeration system having a condenser and an evaporator affixed to the vehicle chassis and a compressor affixed to the prime mover wherein said prime mover is affixed to said chassis by resilient support means for damping vibrations therebetween the improvement comprising fluidic connecting means between said compressor and said condenser and between said compressor and said evaporator consisting solely of lengths of rigid conduit means in at least three different planes and including at least one flexible connector means therebetween positioned in an area of high bending moment resulting from movement of said lengths relative to one another.

2. In an automobile air-conditioner comprising a compressor, a condenser and an evaporator connected together in a closed refrigerant flow circuit, a transport system for conveying refrigerant throughout said circuit comprising:
   a plurality of rigid lengths of tubing resistant to effusion of refrigerant out of and resistant to the infusion of moisture into said tubing said lengths lying in at least three different planes; and
   connectors fastening together adjacent ends of said lengths, said connectors permitting articulating movement between adjacent lengths of tubing while maintaining a seal resistant to leakage of fluid therethrough, said connectors being positioned in areas of high bending moment resulting from movement of said lengths relative to one another.

3. In an automobile air-conditioner comprising a compressor, a condenser and an evaporator connected together in a closed refrigerant flow circuit, a transport system for conveying refrigerant throughout said circuit comprising:
   a plurality of rigid lengths of tubing resistant to effusion of refrigerant out of said resistant to the infusion of moisture into said tubing; and
   connectors fastening together adjacent ends of said lengths, said connectors permitting articulating movement between adjacent lengths of tubing while maintaining a seal resistant to leakage of fluid therethrough, at least one of said connectors including
   (a) an end portion on one of said adjacent lengths having an exterior surface defining a segment of a sphere having a predetermined diameter and a passageway extending therethrough and terminating in an open end;
   (b) an enlarged receiving end on the other of said adjacent lengths, said enlarged receiving end including a segment having a cylindrical interior surface with a diameter larger than said predetermined diameter, an intermediate section tapering from said enlarged receiving end to a size smaller than said predetermined diameter, said first length end portion being received within said enlarged receiving end in spaced relationship with said cylindrical interior surface and tapering intermediate section with a space between said spherical exterior surface and said cylindrical interior surface and the interior surface of said tapering intermediate section;

(c) bearing means in at least two portions of said space, each of said bearing means having a cylindrical surface engaged with said cylindrical interior surface and a spherically shaped surface engaged to said spherical exterior surface;

(d) seal means between said bearing means encircling said spherical exterior surface in sealing relationship therewith and sealingly engaged with said cylindrical interior suface; and, (e) radially inwardly extending flange means engaged to one of said bearing means.

4. A fluid transport system according to claim 3, wherein said radially inwardly directed flange means is integral with said other adjacent length.

5. A fluid transport system according to claim 3, further including a collar encircling said other adjacent length enlarged end and engaging said intermediate section, said flange means being integral with said collar.

6. A fluid transport system according to claim 3, wherein said spherical exterior surface has an apex which is closer to said cylindrical interior surface than other portions of said spherical exterior surface and one of said bearing means is on one side of said apex and another of said bearing means in on another side of said apex.

7. A fluid transport system according to claim 6, further including a spacer engaging said apex and said cylindrical interior surface and wherein said seal means are positioned on both sides of said spacer.

8. In an automotive air-conditioner system comprising a compressor, a condenser and an evaporator connected together in a closed refrigerant flow circuit, a transport system for conveying refrigerant throughout said circuit comprising at least two rigid lengths of tubing connected to said compressor, one of said lengths connected to an inlet of said compressor and the other of said lengths connected to an outlet of said compressor; a third rigid length of tubing and connector means for connecting said third length to said one length; and a fourth rigid length of tubing and connector means for connecting said fourth length to said other length, said lengths of tubing lying in at least three different planes, each of said connector means permitting articulating movement between adjacent lengths while maintaining a seal resistant to leakage of fluid therethrough and positioned in areas of high bending moment resulting from movement of said lengths relative to one another.

9. In an automobile air-conditioner comprising a compressor, a condenser and an evaporator connected together in a closed refrigerant flow circuit, said compressor having an inlet for receiving fluid and an outlet for expelling fluid, a transport system for conveying refrigerant throughout said circuit comprising:

a plurality of rigid lengths of tubing resistant to effusion of refrigerant out of and resistant to the infusion of moisture into said tubing extending between said compressor, condenser and evaporator;

connectors fastening together adjacent ends of said lengths, at least one of said connectors fastened to one of said rigid lengths of tubing directing fluid to said inlet and at least one of said connectors fastened to another of said rigid lengths receiving fluid from said outlet, said connectors permitting articulating movement between adjacent lengths of tubing while maintaining a seal resistant to leakage of fluid therethrough.

10. A transport system according to claim 9, wherein those of said connectors permitting said articulating movement are positioned in areas of said tubing subjected to higher bending moments than other areas of said tubing adjacent thereto.

11. In an automobile air-conditioner comprising a compressor, a condenser and an evaporator connected together in a closed refrigerant flow circuit, a transport system for conveying refrigerant throughout said circuit comprising:

a plurality of rigid lengths of tubing resistant to effusion of refrigerant out of and resistant to the infusion of moisture into said tubing extending between said compressor, condenser and evaporator;

connectors fastening together adjacent ends of said lengths, those of said connectors fastened to said rigid lengths of tubing on opposite sides of said compressor permitting articulating movement between adjacent lengths of tubing while maintaining a seal resistant to leakage of fluid therethrough, said connectors including (a) an exterior wall having a cylindrical inner surface defining an open end and an inwardly tapering inner surface spaced from said open end and extending from one of said lengths of tubing;

(b) an interior wall extending from another of said lengths of tubing, said interior wall having a spherically-shaped outer surface defining an open end, said interior wall positioned within said exterior wall open end in spaced relationship to said cylindrical inner surface and said inwardly tapering inner surface;

(c) gasket and bearing means in the space defined by said spaced relationship including, (i) a first bearing encircling and slidably engaged to said outer surface and in contact with both said cylindrical inner surface and said inwardly tapering inner surface;

(ii) a second bearing encircling and slidably engaged to said outer surface in contact with said cylindrical inner surface adjacent said exterior wall open end; and, (iii) annular gasket means sealingly engaged to said cylindrical inner surface and said spherically-shaped outer surface and positioned between said first and second bearings; and, (d) flange means extending radially inwardly covering a portion of said exterior wall open end, said flange means engaging said second bearing.

12. A transport system according to claim 11, wherein said flange means is integral with said exterior wall.

13. A transport system according to claim 11, wherein said exterior wall has an outer surface which includes an inwardly tapering portion opposing said inwardly tapering inner surface and further including a collar encircling said exterior wall and engaging said outer surface inwardly tapering portion, said flange means being integral with said collar.

14. A transport system according to claim 11, wherein said exterior wall has an outer surface which includes an inwardly tapering portion opposing said inwardly tapering portion and further including a collar, said collar having, (i) a body portion encircling and snugly engaging said exterior wall;

(ii) an inwardly tapering portion engaging said outer surface inwardly tapering portion; and, (iii) an inwardly extending flange engaging said second bearing.

15. A transport system according to claim 11, wherein said gasket and bearing means includes a pair of annular gaskets and a spacer positioned therebetween.

16. In an automobile air-conditioning system comprising a compressor, a condenser and an evaporator connected together in a closed refrigerant circuit, a transport system wherein said compressor is fluidly connected to said condenser and said evaporator and said compressor is subject to movement relative to said condenser and said evaporator, the improvement comprising connecting means between said compressor and at least one of said condenser and said evaporator consisting solely of a plurality of rigid lengths of conduit means with at least three of said rigid lengths being aligned, a pair of flexible connectors each connecting together one end of an intermediate one of said rigid lengths with an end of an adjacent length of another of said rigid lengths to maintain the alignment of the rigid lengths on opposite sides of said intermediate length parallel to each other, said flexible connectors being positioned in areas of high bending moment resulting from movement of joined rigid lengths.

* * * * *